United States Patent
Zhu

(10) Patent No.: US 12,357,119 B1
(45) Date of Patent: Jul. 15, 2025

(54) COFFEE MAKING DEVICE

(71) Applicant: YONGKANG NUOGE ELECTRICAL LTD, Jinhua (CN)

(72) Inventor: Haibo Zhu, Jinhua (CN)

(73) Assignee: YONGKANG NUOGE ELECTRICAL LTD, Jinhua (CN)

( * ) Notice: Subject to any disclaimer, the term of this patent is extended or adjusted under 35 U.S.C. 154(b) by 0 days.

(21) Appl. No.: 19/072,496

(22) Filed: Mar. 6, 2025

(30) Foreign Application Priority Data

Jan. 17, 2025 (CN) .......................... 202510076164.0

(51) Int. Cl.
*A47J 31/32* (2006.01)
*A47J 31/00* (2006.01)

(52) U.S. Cl.
CPC ............. *A47J 31/32* (2013.01); *A47J 31/005* (2013.01)

(58) Field of Classification Search
CPC ................................ A47J 31/005; A47J 31/32
USPC .................................................. 99/322, 323.1
See application file for complete search history.

(56) References Cited

U.S. PATENT DOCUMENTS

| | | | |
|---|---|---|---|
| 11,559,162 B1 * | 1/2023 | Wang | ...................... A47J 31/32 |
| 2023/0200581 A1 * | 6/2023 | Cheung | .................. A47G 19/14 |
| | | | 99/279 |
| 2024/0122395 A1 * | 4/2024 | Diskin | .................... A47J 31/38 |

FOREIGN PATENT DOCUMENTS

| | | | | |
|---|---|---|---|---|
| CH | 517475 A | * | 1/1972 | ............. A47J 31/32 |
| CN | 114747935 A | * | 7/2022 | ............. A47J 31/32 |
| EP | 3831255 A1 | * | 6/2021 | ............ A47J 31/005 |
| WO | WO-2020187162 A1 | * | 9/2020 | ............. A47J 31/32 |

* cited by examiner

*Primary Examiner* — Reginald Alexander
(74) *Attorney, Agent, or Firm* — Birchwood IP

(57) ABSTRACT

A coffee making device is provided. Which includes a cup body, a cup lid, and an extraction component, the extraction component includes an extraction basket, a lower wall of the extraction basket is provided with a plurality of coffee extraction holes; a lid body located at an upper end of an opening of the extraction basket, adapted to the extraction basket, and forms a pressurized space with the extraction basket, a bottom of the lid body is provided with an inflation hole connected to the extraction basket; and a pressurization device configured to pressurize the pressurized space; the pressurization device is provided in the lid body and connected to the inflation hole; or the pressurization device is adapted to the cup lid and connected to an internal space of the lid body. Thus, a user can easily and quickly make fresh coffee drinks in any location.

9 Claims, 9 Drawing Sheets

COFFEE MAKING DEVICE

CROSS-REFERENCE TO RELATED APPLICATIONS

This application claims priority to Chinese Patent Application No. 202510076164.0, filed on Jan. 17, 2025, which is hereby incorporated by reference in its entirety.

TECHNICAL FIELD

The present disclosure relates to the field of beverage preparation equipment technologies, and in particular, to a coffee making device.

BACKGROUND

The common coffee extraction methods on the market currently include coffee machine extraction and hand brew extraction. Coffee machines are usually large in size, expensive, and require an external power source, rendering them inconvenient to carry and use outdoors in places without a power source. Hand brewed coffee requires additional equipment such as filter paper, filter cup, and hand brewed pot, which are relatively cumbersome to operate and not easy to store and carry. Furthermore, existing ordinary cups only have the function of holding liquids and cannot achieve on-site extraction of coffee. Thus, for people who love coffee but are often in a mobile or outdoor environment, the existing coffee extraction methods and equipment cannot meet their needs of enjoying fresh extracted coffee anytime and anywhere.

SUMMARY

To address the shortcomings of existing technology, a coffee extraction cup is provided that can directly extract coffee, solving problems of poor portability, complex operation, and single function of ordinary cups in existing coffee extraction equipment. This allows a user to conveniently and quickly produce fresh coffee drinks in any location using a coffee making device.

The present disclosure is implemented using the following technical solution: a coffee making device, including a cup body, a cup lid, and an extraction component,
where the extraction component includes:
an extraction basket, configured to accommodate coffee powder, a lower wall of the extraction basket is provided with a plurality of coffee extraction holes,
a lid body located at an upper end of an opening of the extraction basket, adapted to the extraction basket and capable of forming a pressurized space with the extraction basket, a bottom of the lid body is provided with an inflation hole connected to the extraction basket; and
a pressurization device, configured to pressurize the pressurized space; the pressurization device is provided in the lid body and connected to the inflation hole; or the pressurization device is adapted to the cup lid and is connected to an internal space of the lid body.

When in use, the lid body is opened, the lid body is removed from an upper end of the opening of the extraction basket, coffee powder and hot water are added to the extraction basket, the lid body is fitted at the upper opening of the extraction basket, so that the opening of the extraction basket is closed by the lid body, and then the pressurization device is started. The pressurization device will pressurize an internal cavity of the extraction basket through the inflation hole, or the pressurization device is connected to the lid body, so that the pressurization device inflates air in the lid body, allowing air to pass through the inflation hole and pressurize the pressurization space, thereby promoting better penetration of hot water into coffee grounds, improving extraction efficiency, and ultimately, the extracted liquid coffee will flow into the cup body through the coffee extraction holes under pressure, and then the cup lid is opened to drink coffee.

Where the pressurization device can be any existing inflation motor that can increase the air pressure in the extraction basket; and the pressurization device is adapted to the cup lid, which can be provided inside the cup lid, fixed on the cup lid, or a separate and portable component that is not provided on the cup lid.

How to form a pressurized space between the lid body and the extraction basket, it can be achieved by interlocking the lid body and the extraction basket, threading between the lid body and the extraction basket, threading between the lid body and the cup lid, and so on.

Where the extraction basket can be integrated with the cup lid or separated from it; it can also be fixed inside the cup body.

Where apertures of the coffee extraction holes are the existing extraction apertures, and the number of coffee extraction holes can be one or multiple.

Where the shape of the extraction basket can be cylindrical or conical.

This solution integrates the coffee extraction function into one cup, which is compact in size and easy to carry. Whether in the office, on outdoor trips, or on business trips, the user can make coffee anytime and anywhere. And compared to traditional hand brewed coffee utensils, this solution does not require complex accessories such as filter paper and filter bowl. The coffee powder is simply put into the extraction basket, hot water is added, the lid body is covered, and the coffee extraction is completed. The operation is simple and fast, even beginners in coffee making can easily get started. At the same time, by applying pressure to the interior of the extraction basket through the pressurization device, hot water can be more fully in contact with coffee powder, thereby improving extraction efficiency and coffee richness, allowing the user to enjoy a rich and mellow coffee beverage.

In some embodiments of the present disclosure, an outer wall of the lid body is provided with external threads, the cup lid is provided with a fitting hole that is axially extended, an inner wall of the fitting hole has internal threads that are compatible with the external threads, and a bottom of the fitting hole is provided with the extraction basket; when the lid body is threaded fixed to the cup lid, the pressurized space is formed between the lid body and the extraction basket.

By threaded fixing of the lid body and cup lid, the lid body closes the opening of the extraction basket to form a pressurized space. This method is simpler, and the user only needs to tighten the lid body to start coffee extraction directly.

In some embodiments of the present disclosure, a first step that is radially inward extended is provided on a bottom inner wall of the fitting hole, the extraction basket is separated from the cup lid, and a convex edge is provided on an outer wall of the opening of the extraction basket, the convex edge abuts against the first step.

The extraction basket and cup lid are separated for easy removal and cleaning of the extraction basket from the cup lid.

In some embodiments of the present disclosure, a second step that is radially inward extended is provided on a bottom inner wall of the fitting hole, and the second step is located below and at a radial inner side of the first step; a circular receiving groove is formed by the second step, an outer wall of the extraction basket and the convex edge; and a sealing ring is provided in the receiving groove.

By providing the second step at the bottom of the fitting hole, when the convex edge of the extraction basket is compacted, the convex edge will press the sealing ring into the annular receiving groove, thereby further improving the sealing performance and enhancing the extraction effect; and preventing air from flowing out of the air area and causing the pressure in the pressurized space to not meet specified requirements.

In some embodiments of the present disclosure, a step that is radially inward extended is provided on a bottom inner wall of the fitting hole, the extraction basket is separated from the cup lid, a convex edge is provided on an outer wall of the opening of the extraction basket, and a sealing ring is provided between the step and the convex edge; when the sealing ring is threaded fixed to the cup lid, the convex edge and sealing ring are compressed on the step.

By providing the sealing ring between the convex edge and the first step through the above scheme, when the sealing ring is compressed, the sealing performance between the convex edge and the first step can be better, and the sealing effect can be further increased to ensure that the pressure in the pressurized space meets the specified requirements.

In some embodiments of the present disclosure, an inner diameter of the extraction basket is gradually increased from bottom to top to present a conical shape.

The inner diameter of the extraction basket is gradually increased from bottom to top to present a conical shape, which facilitates the insertion of the extraction basket into the fitting hole.

In some embodiments of the present disclosure, a fitting section that is downward extended is provided at a bottom opening of the fitting hole, and when the extraction basket is fixed in the fitting hole, an inner wall of the fitting section contacts and fits with an outer wall of the extraction basket.

The above arrangement can enhance the positioning effect of the extraction basket to ensure the integrity of the pressurized space.

In some embodiments of the present disclosure, the pressurization device is provided in the lid body, and the pressurization device includes an inflation pump, a battery, and a circuit board; a top of the lid body is provided with a charging port and a button that is connected to the circuit board, and the inflation pump is connected to the inflation hole through an inflation tube.

The user controls the operation of the inflation pump by pressing the button on the top of the lid body.

In some embodiments of the present disclosure, a rotating protrusion is provided on a top of the lid body.

By providing the rotating protrusion, it is easy for the user to unscrew the cup lid body.

In some embodiments of the present disclosure, the cup lid is threaded with the cup body, and a handle is rotatably connected to the cup lid; the cup lid is provided with a drinking port at a deviation from its center, and the handle is provided with a covering mouth corresponding to the drinking port; a width of the covering mouth is smaller than that of the drinking port; when the handle is in a flat state, the covering mouth of the handle is located at an upper end of the drinking port.

By the covering mouth, the drinking port can be covered in a small area to reduce the entry of dust. At the same time, in order to ensure the pressure balance inside the cup body during extraction, the drinking port is not completely blocked.

Compared with existing technologies, the present disclosure integrates coffee extraction function into one cup, with a compact size and convenient portability. The user can make coffee anytime and anywhere, whether in the office, outdoors, or on business trips. And compared to traditional hand brewed coffee utensils, this solution does not require complex accessories such as filter paper and filter bowel. The coffee powder is simply put into the extraction basket, hot water is added, the lid body is covered, and the coffee extraction is completed. The operation is simple and fast, even beginners in coffee making can easily get started. At the same time, by applying pressure to the interior of the extraction basket through the pressurization device, hot water can be more fully in contact with coffee powder, thereby improving extraction efficiency and coffee richness, allowing the user to enjoy a rich and mellow coffee beverage.

Numeral reference: 1—cup body; 2—cup lid; 21. handle; 211—covering mouth; 22—drinking port; 23—fitting section; 24—fitting hole; 3—lid body; 31—upper lid; 32—lower lid; 321—connection column; 33—rotating protrusion; 4—extraction basket; 41—convex edge; 5.—battery; 51—inflation pump; 6—inflation hole; 7—sealing ring; 81—first step; 82—second step; 83—step; 9—pressurization device; 91—flexible hose.

DESCRIPTION OF EMBODIMENTS

The present disclosure will be further described based on the accompanying drawings and specific embodiments.

Figure 1:
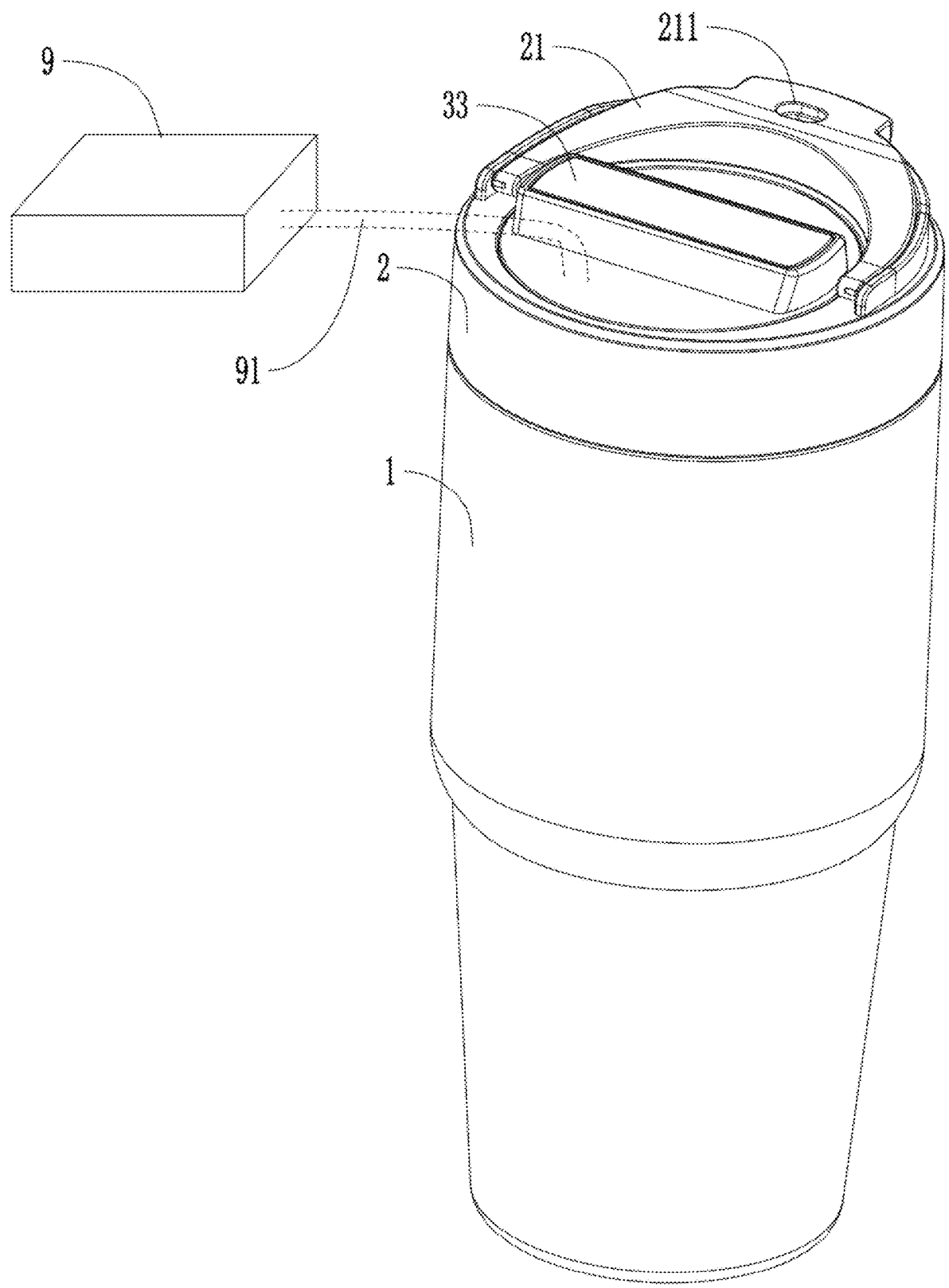
FIG. 1 is a schematic structural diagram of the present disclosure.
Figure 2:
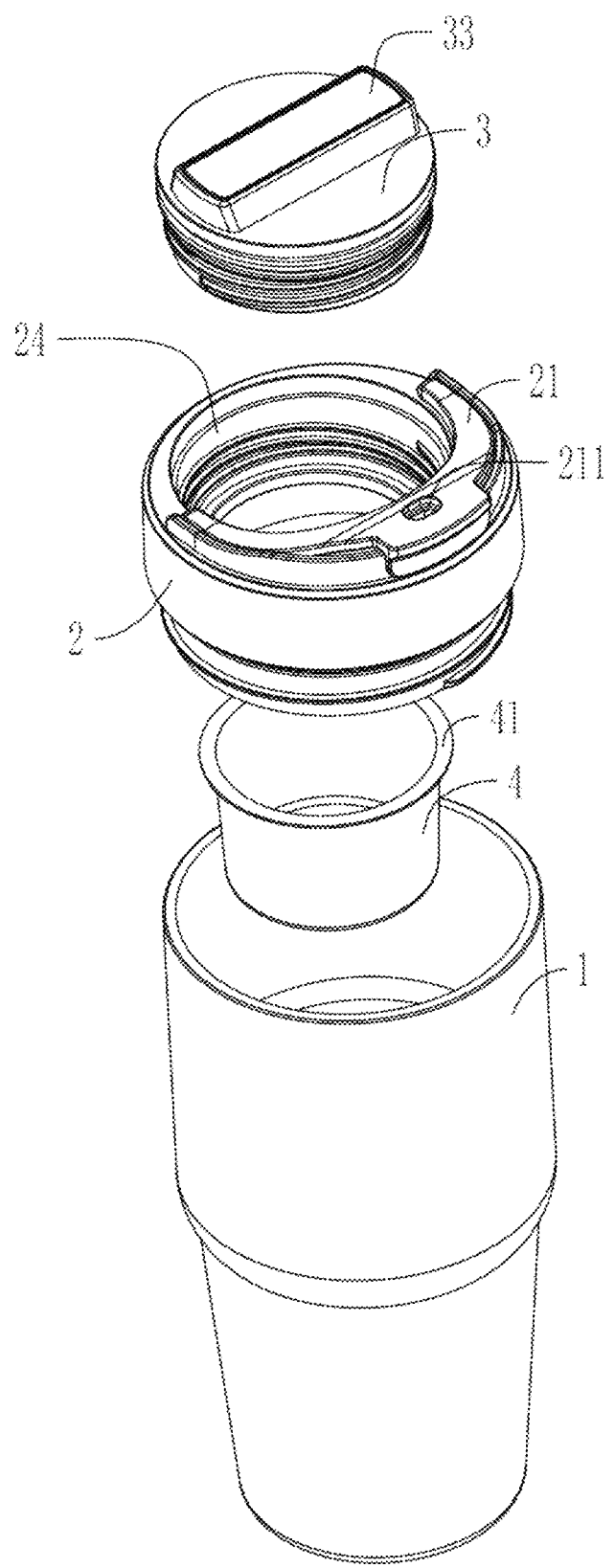
FIG. 2 is a schematic diagram of an explosion structure in FIG. 1.
Figure 4:
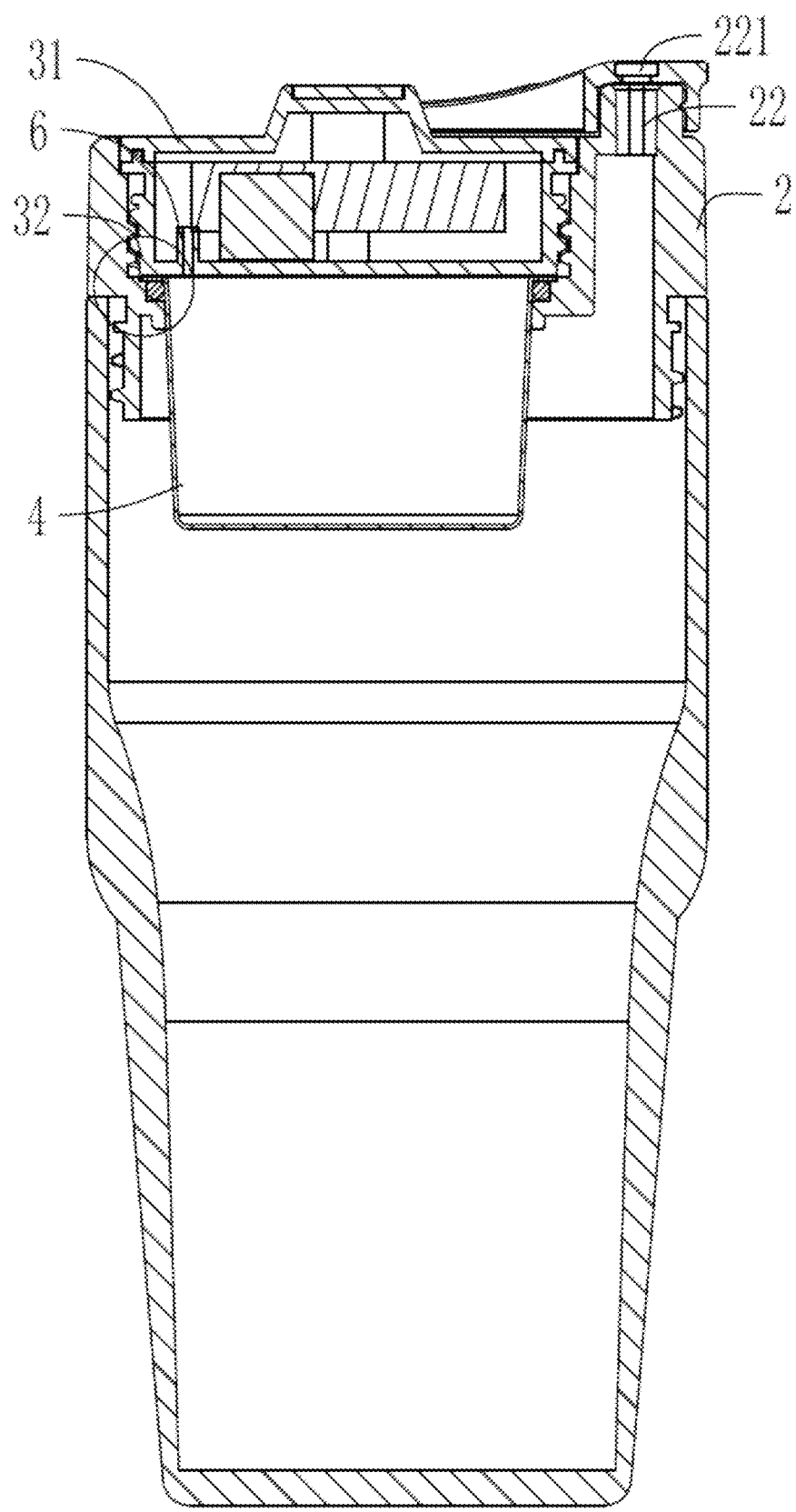
FIG. 4 is a sectional view of FIG. 1.
Figure 6:
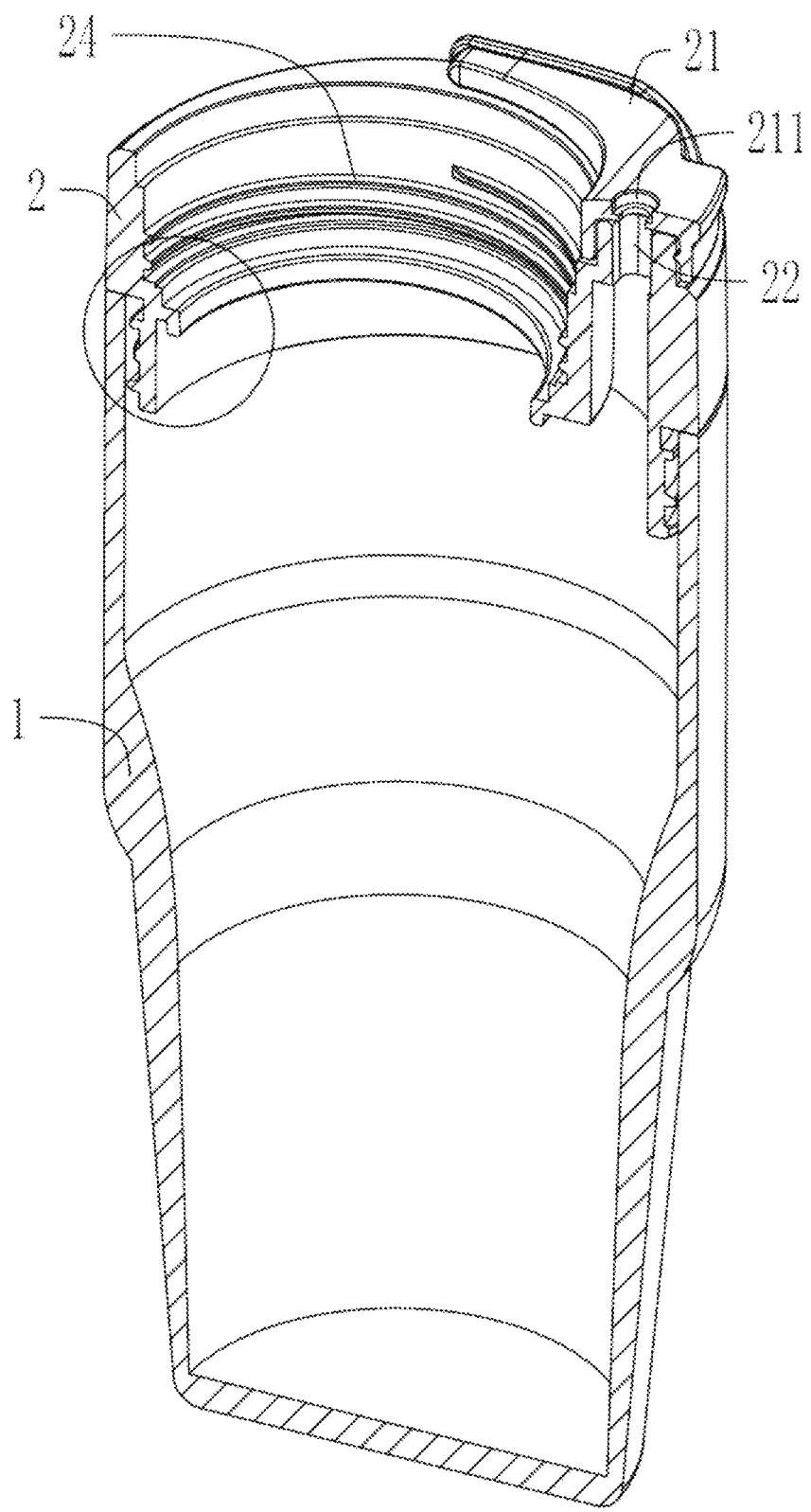
FIG. 6 is a sectional view of a cup body and a cup lid.

As shown in FIGS. 1, 2, 4, and 6, an embodiment discloses a coffee making device including a cup body 1 and a cup lid 2. An inner layer of the cup body 1 is made of food grade stainless steel material configured to accommodate coffee liquid, and an outer layer thereof is made of stainless-steel material for insulation and protection. The cup lid 2 is threaded fit with the cup body 1. There is a fitting hole 24 that runs through top and bottom of the cup lid 2, and the fitting hole 24 can match with an extraction basket 4 and a lid body 3. A top of the cup lid 2 is rotatably connected with a handle 21. The cup lid 2 is provided with a drinking port 22 at a deviation from its center, and the handle 21 is provided with a covering mouth 211 corresponding to the drinking port 22. A width of the covering mouth 211 is smaller than that of the drinking port 22. When the handle 21 is in a flat state, the covering mouth 211 of the handle is located at an upper of the drinking port 22.

Figure 3:
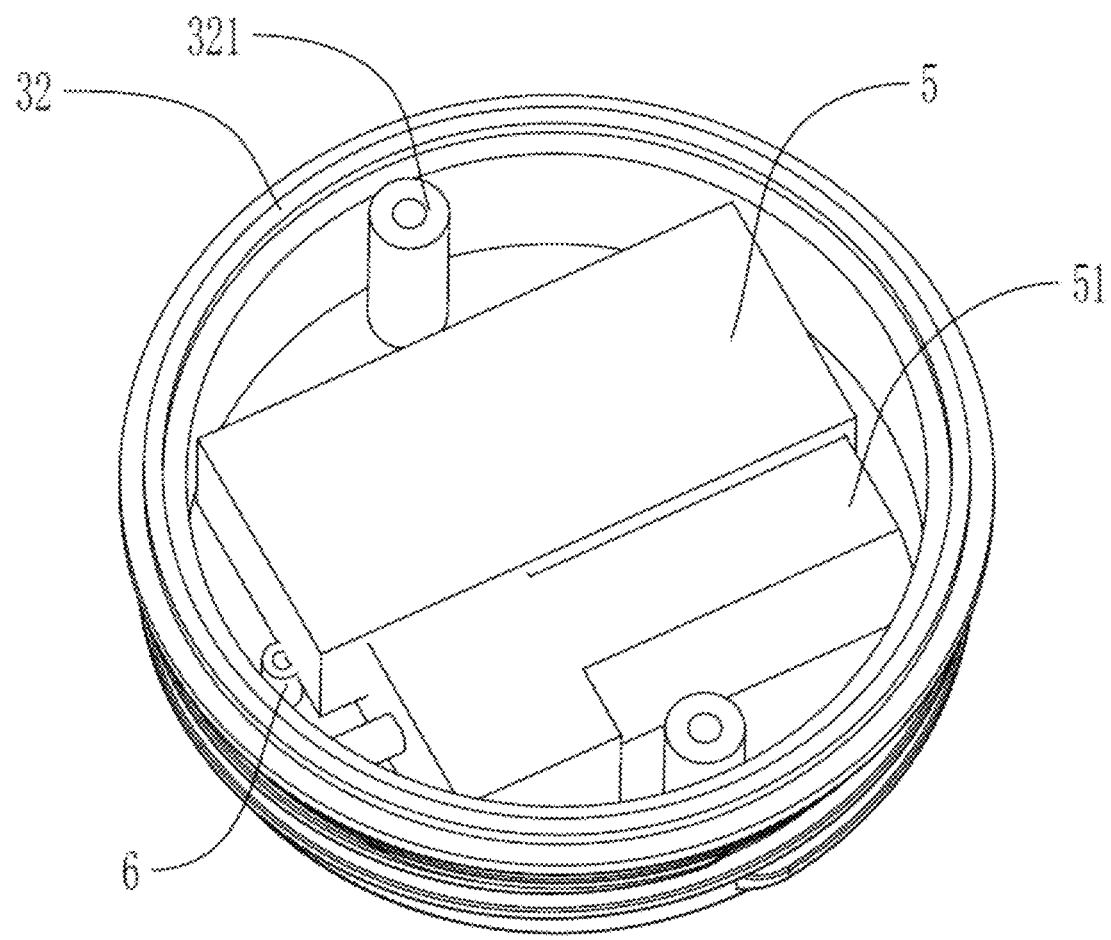
FIG. 3 is a schematic diagram of an internal structure of a lid body.
Figure 5:
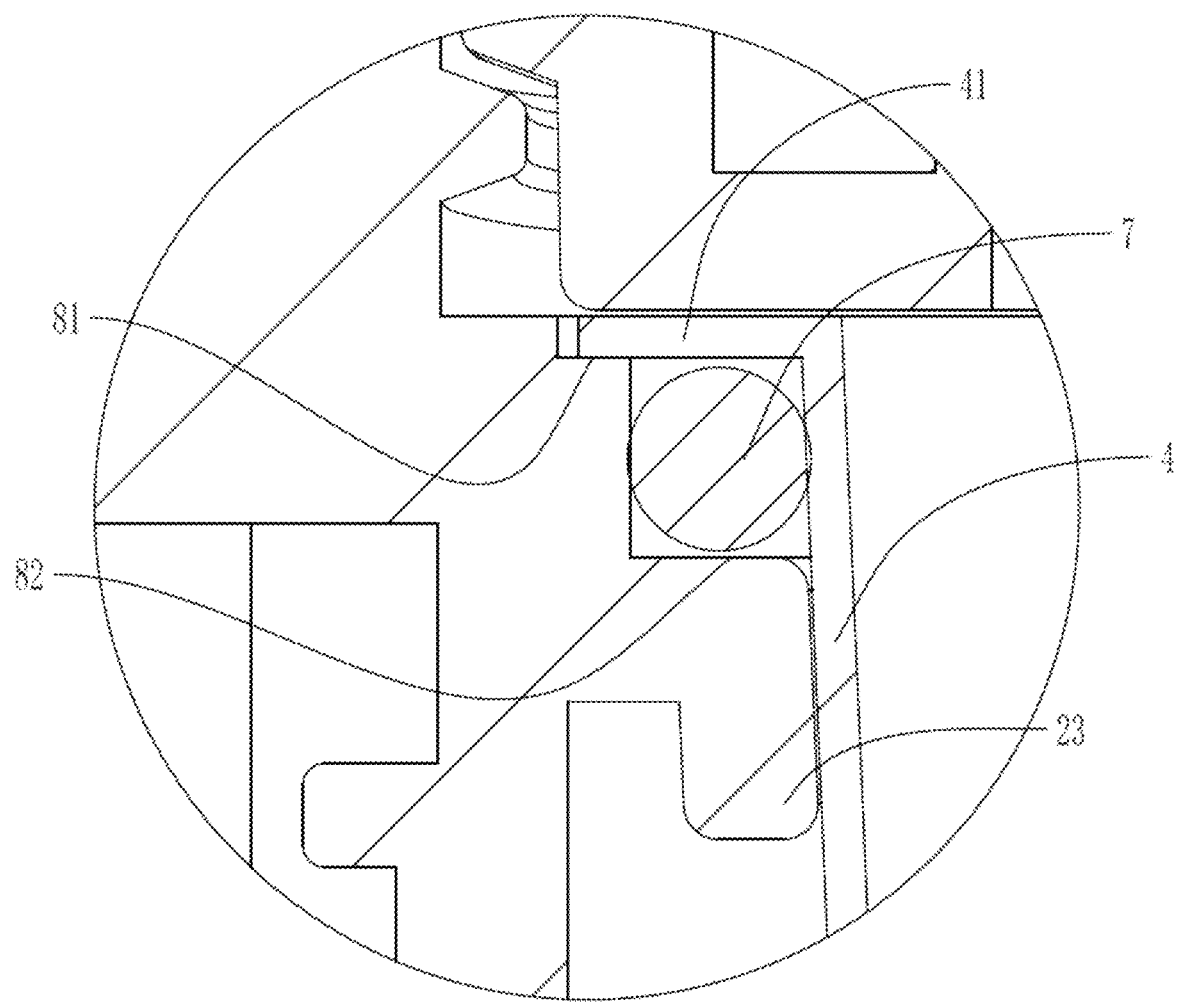
FIG. 5 is an enlarged view of a circled area in FIG. 4.
Figure 7:
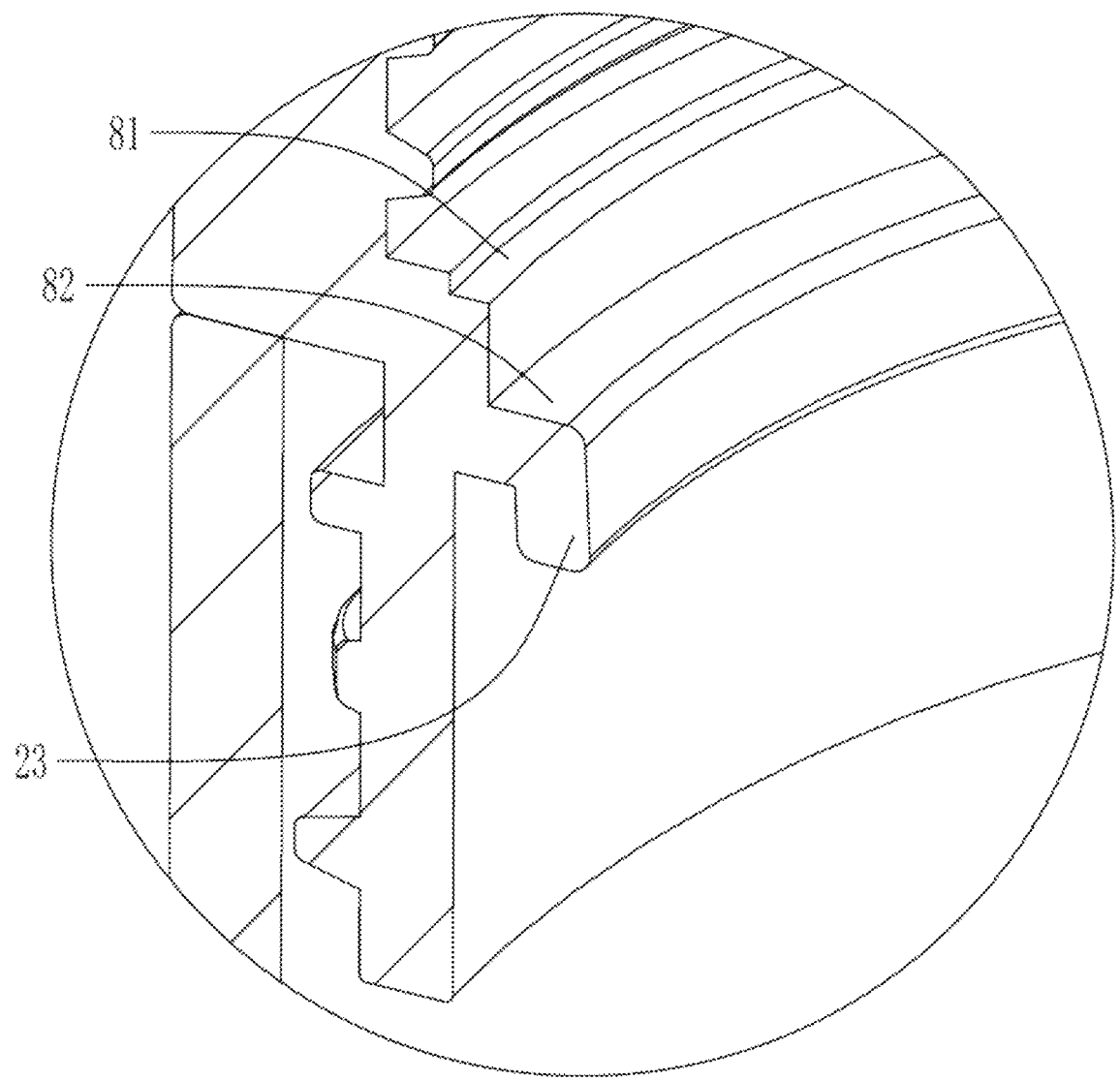
FIG. 7 is an enlarged view of FIG. 6.
Figure 8:
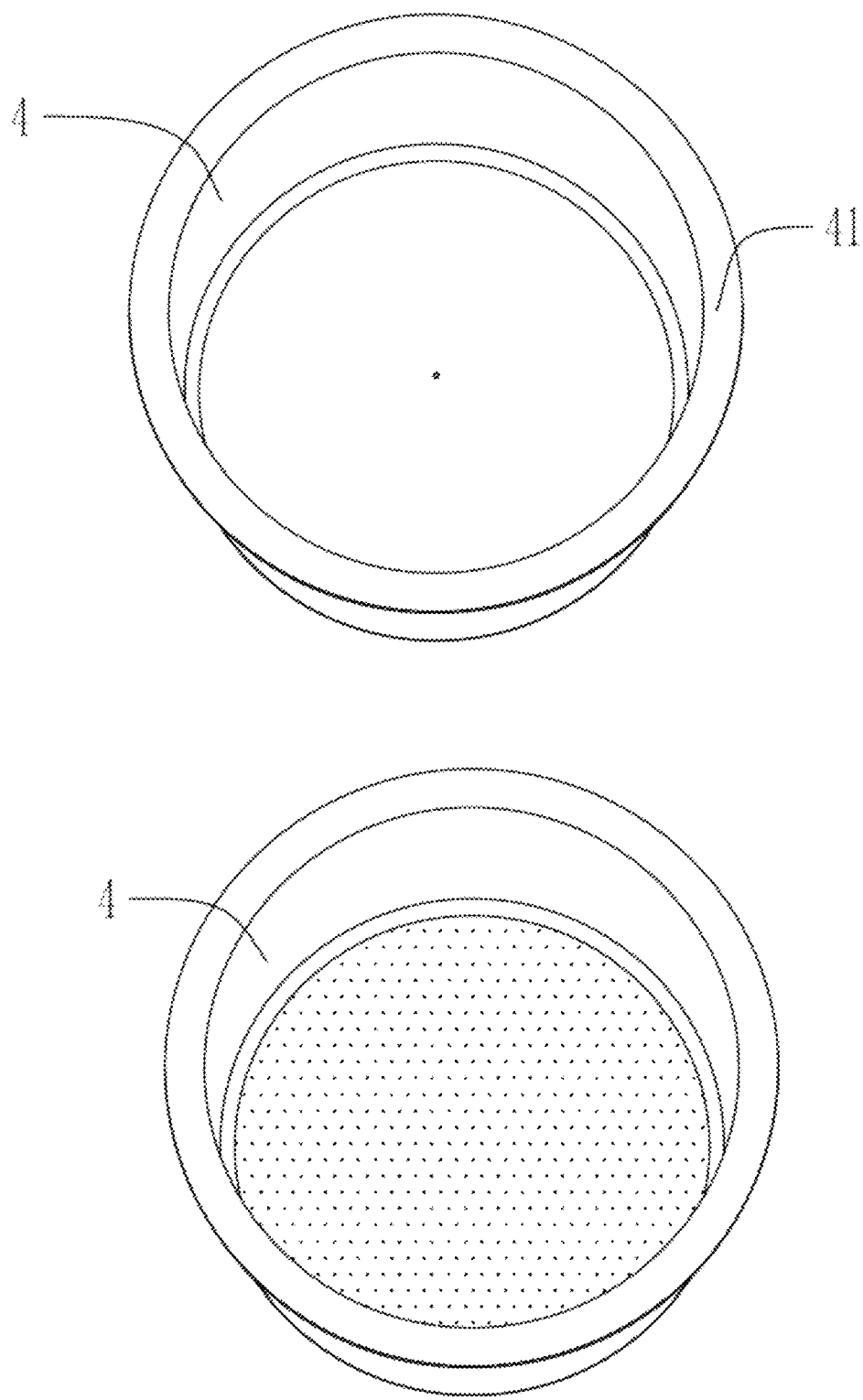
FIG. 8 is a schematic structural diagram of two types of extraction baskets.
Figure 9:
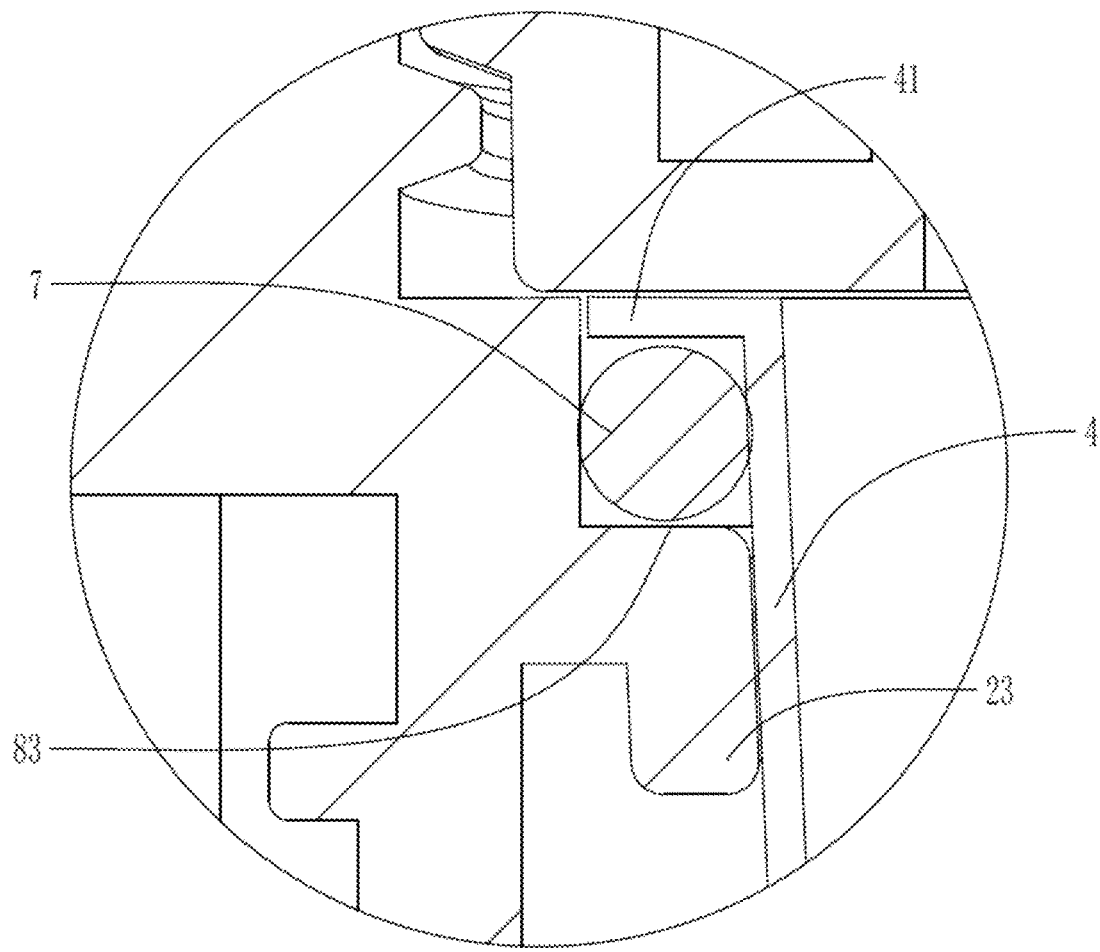
FIG. 9 is a schematic structural diagram of an embodiment.

As shown in FIGS. 1 to 8, the cup lid 2 is provided with the fitting hole 24 that runs through the top and bottom, and the fitting hole 24 has an internal thread structure inside. An outer wall of the lid body 3 has an external thread structure that matches the internal thread structure of the fitting hole 24. A top surface of the lid body 3 is provided with a rotating protrusion 33 that can facilitate a rotation of the lid body 3. The rotating protrusion 33 protrudes upward and can be in a cross shape, a straight shape, a M-shaped, etc. This embodiment is a straight shape. When the lid body 3 is screwed into place on the cup lid 2, a top surface of the lid body 3 is flush with a top surface of the cup lid 2. A bottom of the fitting hole 24 can be provided with the extraction basket 4, and an inner diameter of the extraction basket 4 is gradually increased from bottom to top so as to form a conical shape. The extraction basket 4 is provided with an upward opening and configured to accommodate coffee powder and hot water. A bottom of the extraction basket 4 is provided with coffee extraction holes, and the number of the coffee extraction holes can be one or multiple arranged in a mesh pattern.

The lid body 3 is composed of an upper lid 31 and a lower lid 32. The lower lid 32 is provided with a connection column 321, and the connection column 321 has a threaded hole. The fixing of the upper lid 31 and the lower lid 32 is achieved by screwing. A pressurization device 9 for pressurizing an internal cavity of the extraction basket 4 is provided in a chamber composed of the upper lid 31 and the lower lid 32. A bottom of the lid body 3 is provided with an inflation hole 6 connected to the extraction basket 4. The pressurization device 9 includes an inflation pump 51, a battery 5, and a circuit board. A top of the lid body 3 includes a charging port and a button connected to the circuit board. The inflation pump 51 and the inflation hole 6 are connected by an inflation tube, and the inflation tube is a flexible hose 91.

A first step 81 that is radially inward extended is provided on a bottom inner wall of the fitting hole 24. The extraction basket 4 is separated from the cup lid 2, and a convex edge 41 is provided on an outer wall of an opening of the extraction basket 4. The convex edge 41 abuts against the first step 81, and when the lid body 3 is threaded fixed to the cup lid 2, a lower end convex edge 41 of the lid body 3 abuts against and pressed onto the first step 81. At the bottom opening of the fitting hole 24, there is a fitting section 23 that is downward extended. When the extraction basket 4 is fixed in the fitting hole 24, an inner wall of the fitting section 23 contacts and fits with an outer wall of the extraction basket 4. There is also a second step 82 that is radially inward extended on a bottom inner wall of the fitting hole 24, the second step 82 is located below and at a radial inner side of the first step 81. When the lid body 3 is screwed onto the cup lid 2, a circular receiving groove is formed between the second step 82, an outer wall of the extraction basket 4, and the convex edge 41. The receiving groove is provided with a sealing ring 7, and a diameter of the sealing ring 7 can be slightly larger than a width of the receiving groove. When the convex edge 41 is compressed, the sealing ring 7 can be squeezed to achieve better sealing effect. And the sealing ring 7 is an O-ring seal.

In an implementation mode, a step 83 that is radially inward extended is provided on a bottom inner wall of the fitting hole. The extraction basket 4 is separated from the cup lid 2, and a convex edge 41 is provided on an outer wall of the opening of the extraction basket 4. A sealing ring 7 is provided between the step 83 and the convex edge 41. When the sealing ring 7 is screwed onto the cup lid 2, the convex edge 41 and the sealing ring 7 are pressed onto the step 83.

In actual use, a user first unscrews the lid body 3 from the cup lid 2, places the extraction basket 4 into the fitting hole 24, then puts the coffee powder into the extraction basket 4 and pours hot water. After that, the lid body 3 is screwed onto the cup lid 2, and then presses the button on the lid body 3. The inflation pump 51 in the lid body 3 starts to pressurize the extraction basket 4. The hot water penetrates the coffee powder and is discharged from the coffee extraction holes and falls into the cup body, and finally, the user can drink coffee.

In an implementation mode, the pressurization device 9 is provided in the cup lid 2 or fixed on the cup lid, and there is an air nozzle at a top of the lid body 3. The inflation pump is connected to the air nozzle through the flexible hose 91. When the lid body 3 is screwed onto the cup lid 2, the hose 91 of the inflation pump can be connected to the lid body 3 to achieve inflation of the lid body 3. The air passes through the inflation hole 6 and pressurizes the extraction basket 4.

In an implementation mode, the pressurization device 9 is provided outside the cup lid 2. The pressurization device 9 is an independent component that can be carried around and can be connected by a rope to the cup body 1 or cup lid 2 for easy carrying together. There is an air nozzle at a top of the lid body 3, and the inflation pump is connected to the air nozzle through the flexible hose 91. When the lid body 3 is screwed onto the cup lid 2, the hose 91 of the inflation pump can be connected to the lid body 3 to achieve inflation of the lid body 3. The air passes through the inflation hole 6 and pressurizes the extraction basket 4.

What is claimed is:

1. A coffee making device, comprising a cup body, a cup lid, and an extraction component,
   wherein the extraction component comprises:
   an extraction basket, configured to accommodate coffee powder, a lower wall of the extraction basket is provided with a plurality of coffee extraction holes,
   a lid body located at an upper end of an opening of the extraction basket, adapted to the extraction basket and capable of forming a pressurized space with the extraction basket, a bottom of the lid body is provided with an inflation hole connected to the extraction basket; and
   a pressurization device, configured to pressurize the pressurized space; the pressurization device is provided in the lid body and connected to the inflation hole; or the pressurization device is connected to the lid body through a flexible hose;
   wherein the pressurization device is provided in the lid body, and the pressurization device comprises an inflation pump, a battery, and a circuit board;
   a top of the lid body is provided with a charging port and a button that is connected to the circuit board, and the inflation pump is connected to the inflation hole through an inflation tube.

2. The coffee making device according to claim 1, wherein an outer wall of the lid body is provided with external threads, the cup lid is provided with a fitting hole that is axially extended, an inner wall of the fitting hole has internal threads that are compatible with the external threads, and a bottom of the fitting hole is provided with the extraction basket;
   when the lid body is threaded fixed to the cup lid, the pressurized space is formed between the lid body and the extraction basket.

3. The coffee making device according to claim 2, wherein a first step that is radially inward extended is provided on a bottom inner wall of the fitting hole, the extraction basket is separated from the cup lid, and a convex edge is provided on an outer wall of the opening of the extraction basket, the convex edge abuts against the first step.

4. The coffee making device according to claim 3, wherein a second step that is radially inward extended is provided on a bottom inner wall of the fitting hole, and the second step is located below and at a radial inner side of the first step;
   a circular receiving groove is formed by the second step, an outer wall of the extraction basket, and the convex edge, and a sealing ring is provided in the receiving groove.

5. The coffee making device according to claim 2, wherein a step that is radially inward extended is provided on a bottom inner wall of the fitting hole, the extraction basket is separated from the cup lid, a convex edge is provided on an outer wall of the opening of the extraction basket, and a sealing ring is provided between the step and the convex edge;
   when the sealing ring is threaded fixed to the cup lid, the convex edge and the sealing ring are compressed on the step.

6. The coffee making device according to claim 1, wherein an inner diameter of the extraction basket is gradually increased from bottom to top to present a conical shape.

7. The coffee making device according to claim 2, wherein a fitting section that is downward extended is provided at a bottom opening of the fitting hole, and when the extraction basket is fixed in the fitting hole, an inner wall of the fitting section contacts and fits with an outer wall of the extraction basket.

8. The coffee making device according to claim 2, wherein a rotating protrusion is provided on a top of the lid body.

9. The coffee making device according to claim 1, wherein the cup lid is threaded with the cup body, and a handle is rotatably connected to the cup lid;
   the cup lid is provided with a drinking port at a deviation from its center, and the handle is provided with a covering mouth corresponding to the drinking port;
   a width of the covering mouth is smaller than that of the drinking port;
   when the handle is in a flat state, the covering mouth of the handle is located at an upper end of the drinking port.

* * * * *